US009635133B2

United States Patent
Abdulhayoglu (10) Patent No.: US 9,635,133 B2
(45) Date of Patent: Apr. 25, 2017

(54) SYSTEM FOR SERVING CONTENT BASED ON A USER PROFILE

(76) Inventor: Melih Abdulhayoglu, Montclair, NJ (US)

( * ) Notice: Subject to any disclaimer, the term of this patent is extended or adjusted under 35 U.S.C. 154(b) by 0 days.

(21) Appl. No.: 13/528,984

(22) Filed: Jun. 21, 2012

(65) Prior Publication Data

US 2013/0144970 A1 Jun. 6, 2013

Related U.S. Application Data

(60) Provisional application No. 61/499,899, filed on Jun. 22, 2011.

(51) Int. Cl.
*G06F 15/16* (2006.01)
*H04L 29/08* (2006.01)

(52) U.S. Cl.
CPC .............. *H04L 67/32* (2013.01); *H04L 67/02* (2013.01); *H04L 67/20* (2013.01); *H04L 67/22* (2013.01); *H04L 67/306* (2013.01)

(58) Field of Classification Search
CPC ....... H04L 67/02; H04L 29/06; H04L 67/306; H04L 69/329; H04L 67/34; H04L 67/36; H04L 67/20; H04L 63/0281; H04L 63/0407; H04L 63/0428; H04L 67/42; H04L 63/20; H04L 43/026; H04L 67/28; H04L 12/14; H04L 12/588

USPC ................ 709/203, 212, 216, 217, 219, 224
See application file for complete search history.

(56) References Cited

U.S. PATENT DOCUMENTS

| | | | | |
|---|---|---|---|---|
| 7,599,852 | B2 * | 10/2009 | Bosarge et al. ............ | 705/14.49 |
| 2007/0233857 | A1 * | 10/2007 | Cheng et al. ................. | 709/224 |
| 2007/0244750 | A1 * | 10/2007 | Grannan et al. ................ | 705/14 |
| 2008/0120160 | A1 * | 5/2008 | Woo et al. ........................ | 705/8 |
| 2009/0327084 | A1 * | 12/2009 | Patton et al. .............. | 705/14.73 |
| 2010/0017696 | A1 * | 1/2010 | Choudhary ....... | G06F 17/30902 715/205 |
| 2011/0041153 | A1 * | 2/2011 | Simon et al. ................... | 725/46 |

* cited by examiner

*Primary Examiner* — Arvin Eskandarnia
*Assistant Examiner* — Thao Duong (57) ABSTRACT

There is provided a computer implemented system and method for building a profile of a user associated with a particular IP address. The system and method include establishing a proxy server for a plurality of discrete client IP addresses and providing a connection there from to a wide area network through the proxy server. A list of resources provided to each of the discrete client IP addresses is logged on the proxy server, and a profile is determined for each of the discrete client IP addresses based on a predetermined formula. Advertisements and content are served to each of the discrete client IP addresses corresponding to the user's profile.

6 Claims, 9 Drawing Sheets

Query in status bar
32

SYSTEM FOR SERVING CONTENT BASED ON A USER PROFILE

CROSS REFERENCE TO RELATED APPLICATIONS

This application claims the benefit of priority to U.S. Provisional Application No. 61/499,899, filed Jun. 22, 2011 which is incorporated herein in its entirety by reference.

The present invention relates to a system and method for serving online content based on a user's online profile.

BACKGROUND

The existing model for online advertising includes stake holders such as advertisers, advertising network/affiliate network, publisher, and users. In the existing model, the advertiser pays advertiser network money e.g.: cost per click (CPC) or cost per mile (CPM). The advertising network goes out to publishers and shares some of the revenue it receives from the advertiser in return for getting traffic from publishers to advertisers. However, this has the drawbacks of the advertisements which are sent to the user having viruses, malware, spyware, corrupt files and other potentially harmful features.

SUMMARY

With the present invention, there is an ability to become an advertising network using a totally new channel for traffic generation, i.e. user owners. Unlike the prior existing model which utilizes publishers for traffic generation, the present invention uses "user owners" for traffic generation.

The system of the present invention has numerous advantages. In particular, the present system provides more relevant search results as the entire user behavior can be seen, which is unlike other advertiser networks. When coupled with virus free or trusted ads from a trusted ad server, users are motivated to become a traffic generation advertising network.

Modifying what end users see, as far as ads/links are concerned, require the user's consent. This could be obtained both at ISP or end user level from the end user because in return, a virus free warranty is provided against infection from ads. This is important as malvertising is a threat.

The present invention provides a computer implemented system and method for building a profile of a user associated with a particular IP address which includes establishing a proxy server for a plurality of discrete client IP addresses and providing a connection from the discrete client IP addresses to a wide area network through the proxy server. The invention then logs on the proxy server a list of resources provided to each of the discrete client IP addresses and determines a profile of the list of resources provided for each of the discrete client IP addresses based on a predetermined formula. The system of the invention then serves and delivers advertisements (or more generally; "content") to each of the discrete client IP addresses corresponding to the profile.

BRIEF DESCRIPTION OF THE DRAWINGS

The accompanying drawings illustrate various embodiments of the present invention and system and are a part of the specification. The illustrated embodiments are merely examples of the present system and invention and do not limit the scope thereof.

DETAILED DESCRIPTION

Figure 1A:
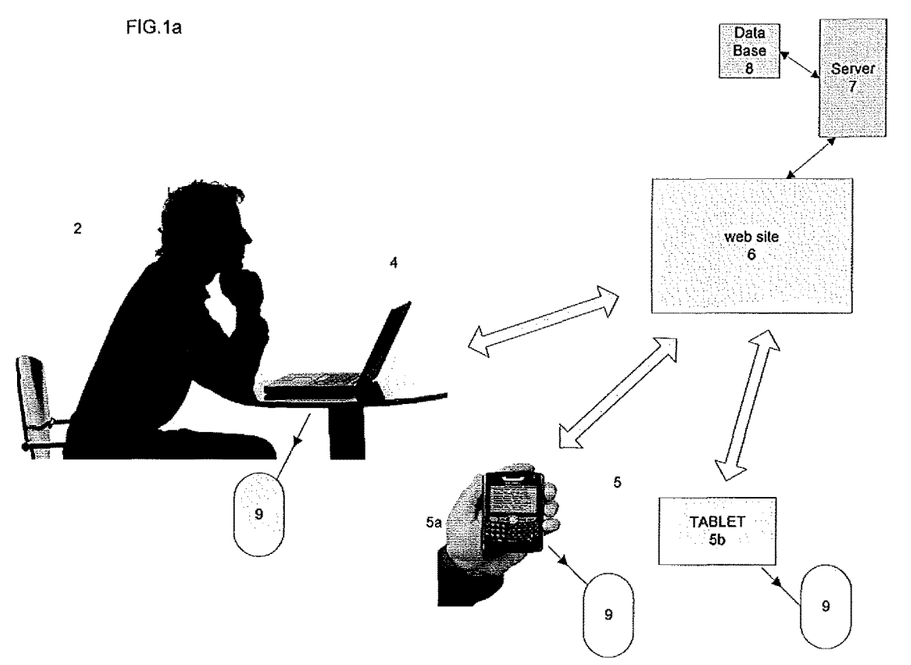
FIG. 1a is a schematic of a user accessing a website from a computer or handheld device.

As shown generally by FIG. 1a, there is a user 2 of a computer 4 or handheld device 5 who accesses an Internet website 6 with network connections to a server 7 and database 8. The user 2 is potentially exposed to many malicious or unsafe advertisements located on the website 6 due to lack of security and validation with the advertising source, even though the website 6 itself may be known as reliable and trusted. Those of skill in the art would recognize that the computer 4 or hand held devices 5a or 5b each has a processor and a memory coupled with the processor where the memory is configured to provide the processor with executable instructions. A boot disk 9 is present for initiating an operating system as well for each of the computer 4 or hand held devices 5. It should also be noted that as used herein, the term handheld device includes phones, smart phones, tablets, personal digital assistants, media and game players and the like. As used throughout, the term "query" or "queries" is used in the broadest manner to include requests, polls, calls, summons, queries, and like terms known to those of skill in the art.

Figure 1B:
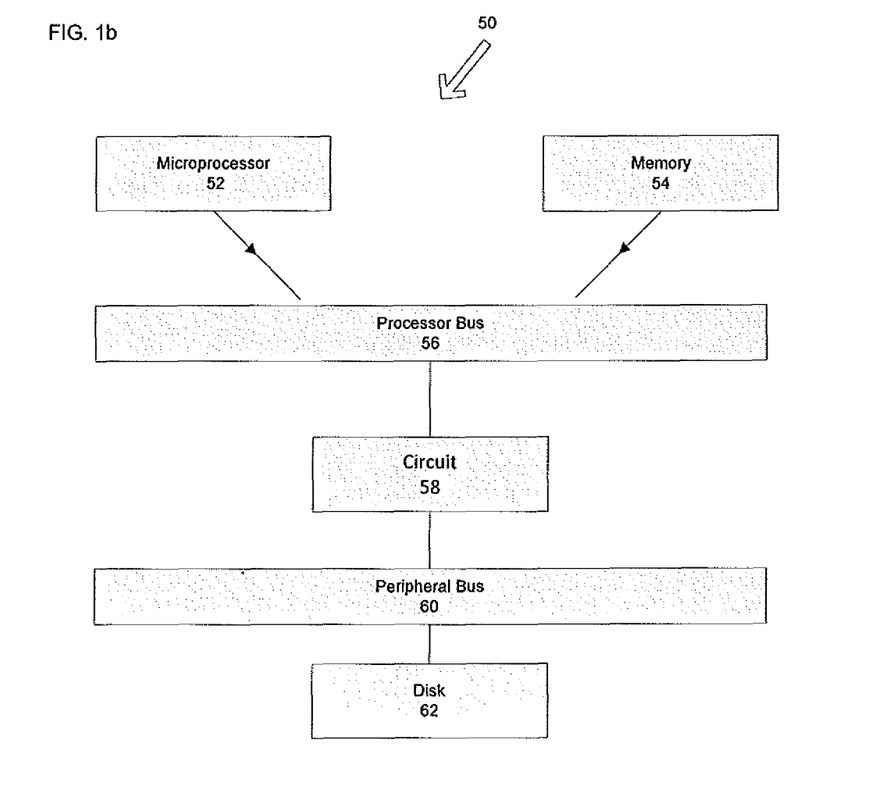
FIG. 1b illustrates a system 50 of a computer or device

FIG. 1b illustrates a system 50 of a computer or device which includes a microprocessor 52 and a memory 54 which are coupled to a processor bus 56 which is coupled to a peripheral bus 60 by circuitry 58. The bus 60 is communicatively coupled to a disk 62. It should be understood that any number of additional peripheral devices are communicatively coupled to the peripheral bus 60 in embodiments of the invention. Further, the processor bus 56, the circuitry 58 and the peripheral bus 60 compose a bus system for computing system 50 in various embodiments of the invention. The microprocessor 52 starts disk access commands to access the disk 62. Commands are passed through the processor bus 56 via the circuitry 58 to the peripheral bus 60 which initiates the disk access commands to the disk 62. In various embodiments of the invention, the present system intercepts the disk access commands which are to be passed to the hard disk.

Figure 1C:
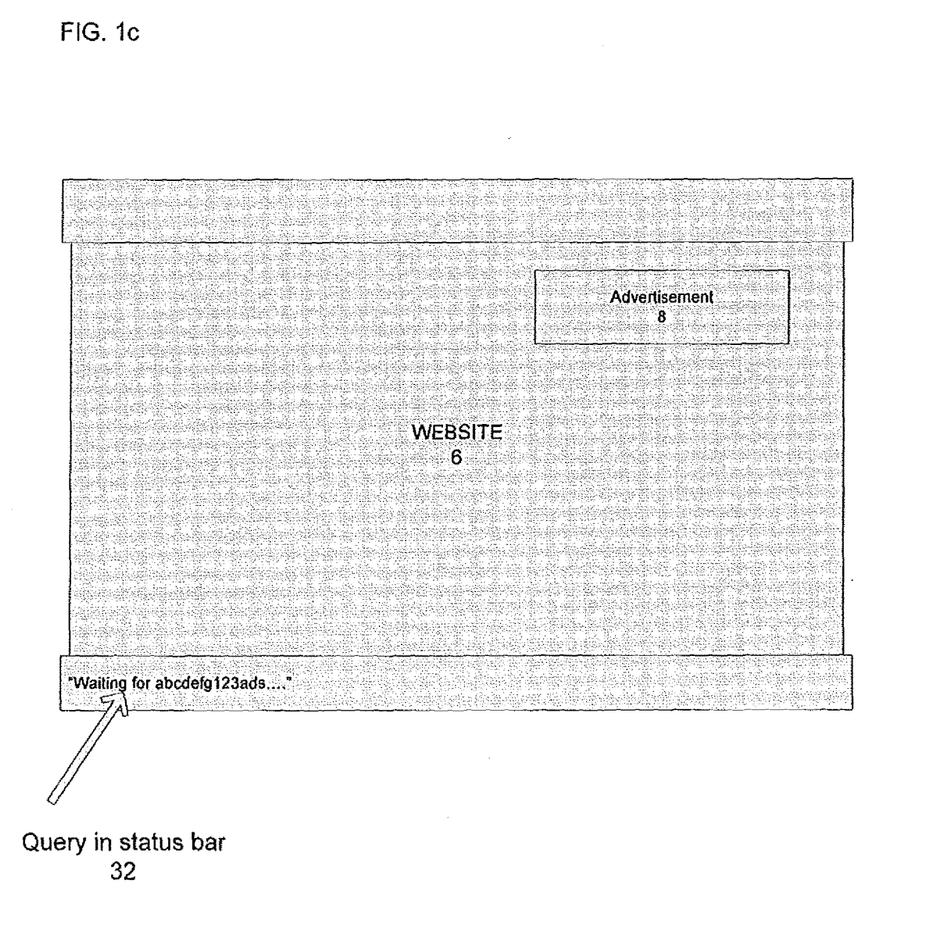
FIG. 1c illustrates a website with an advertisement located within a web browser window and the query status bar.

In further detail, FIG. 1c illustrates a website 6 with an advertisement 8 to be located at a particular place on the site 6. There is shown in FIG. 1c a pending query in the status bar 32 located at the bottom of the web browser with a code to query an ad network. In this manner, advertisement(s) 8 for the website 6 are retrieved from the advertising source. Those of skill in the art would recognize that the computer 4 or hand held device 5 each has a processor and a memory coupled with the processor where the memory is configured to provide the processor with executable instructions. Each of the computers 4 or handheld devices 5 have a discreet IP address associated with the device (and hence, the user 2) for online searching and website browsing. It should also be noted that as used herein, the term handheld device includes phones, smart phones, tablets, personal digital assistants, media and game players and the like. As used throughout, the term "query" or "queries" is used in the broadest manner to include requests, polls, calls, summons, queries, and like terms known to those of skill in the art.

Figure 2:
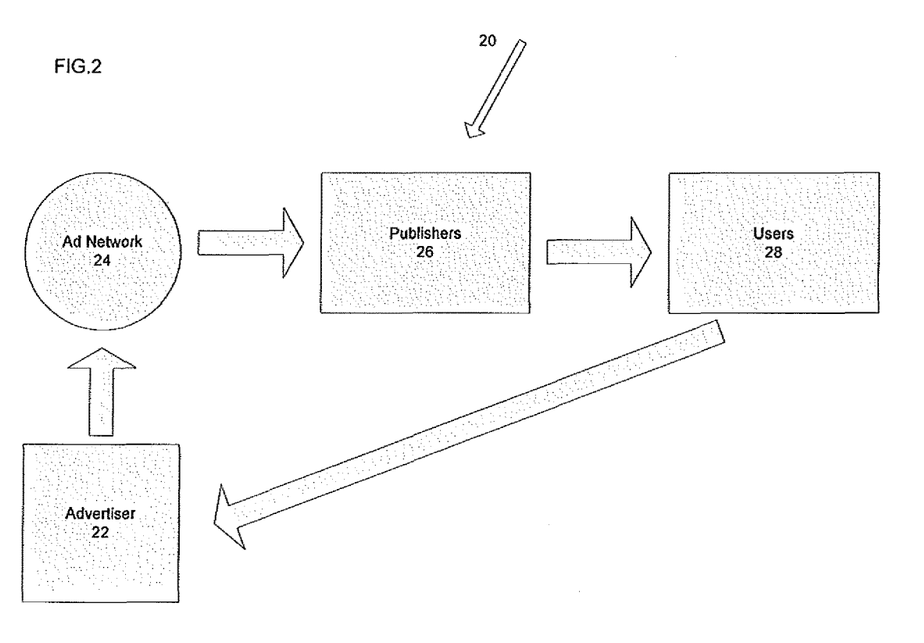
FIG. 2 is schematic illustration of a known system for serving content.

Referring to FIG. 2, there is shown the present system of online advertising 20. In this system, the advertiser 22 contacts the ad network 24 which stores the ad 8. Currently, advertisers 22 pay revenue to the ad networks 24 which then send revenue to publishers 26. The publisher then sends the ad to the user 28.

Figure 3:
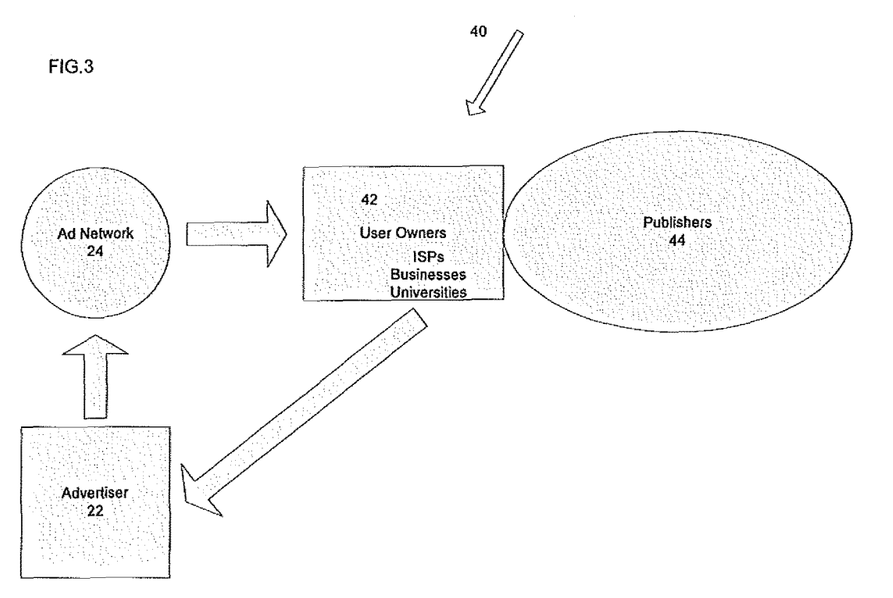
FIG. 3 is a schematic illustration of the system of the present invention.

As shown in FIG. 3, the stake holders in the system of the present invention 40 include the advertiser 22, an advertising network or affiliate network 24, user owners 42, and publishers 44. In the present system 40, advertisers 22 pay revenue to the ad networks 24 who then pay user owners 42 who can act as distribution channels and generate traffic. The user owners 42 with the present invention include various distribution channels as traffic generators. Distribution channels with respect to the present invention include ISPs, businesses or universities, and end user reach (toolbars/AVs etc). The system of the present invention provides the ability to view all user online behavior, and therefore greatly increase optimization of advertising. Further, the advertisers 22 and ad networks 24 may be limited to trusted advertisements and trusted networks which are known to be safe and free of problems such as viruses, malware, spyware, malicious or malformed code. The methods of implementation of the present invention include: 1.) proxy, 2.) client side code, and 3.) DNS.

In order to make the user owner into a traffic generation entity, certain items of what the user sees as a display on the web page viewed are modified. The items which are replaced/modified or edited include: 1. ads, 2. existing links, 3. links from words (turning words into links)—depending on the previous user behavior, any future pages the user accesses could be filled with newly created links to represent user behavior, and 4. replace search results from both search engines, such as Google or Bing, or in affiliate sites (adsense like).

It is important to maintain the publishers in the present system as the system is replacing ads and other advertising related stuff, and the publishers create the advertising ecosystem. The system of the present invention 40 provides very relevant advertising, and therefore, publishers 44 provide the system 40 more business than the traffic which may possibly be taken away from them because the system 40 brings more relevant advertising which then results in higher return for the publishers 44.

Figure 4:
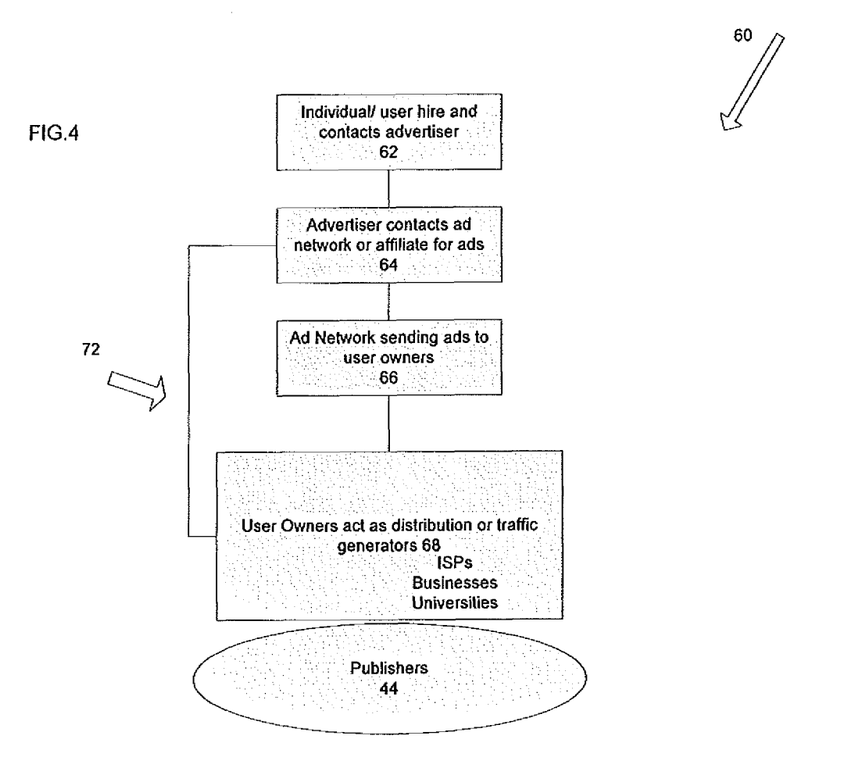
FIG. 4 is a flow diagram of the method of the present invention.

FIG. 4 illustrates a flow diagram corresponding to a method 60 of the present system. First the individual or a user hires and contacts an advertiser (Step 62). Then the advertiser contacts an ad network or affiliate (Step 64) and the sends ads to the user owners (Step 66). Next, with the present system the user owners act as distribution and/or traffic generators 68. The distribution can include entities such as ISP's, businesses, and universities. The publishers 44 are kept in the system and method of the present invention. As the advertisements are significantly targeted, the user owners then contact the advertiser (Step 72), and therefore generate increase revenue. The method may be repeated with additional advertising purchases from Step 64 again.

Figure 5:
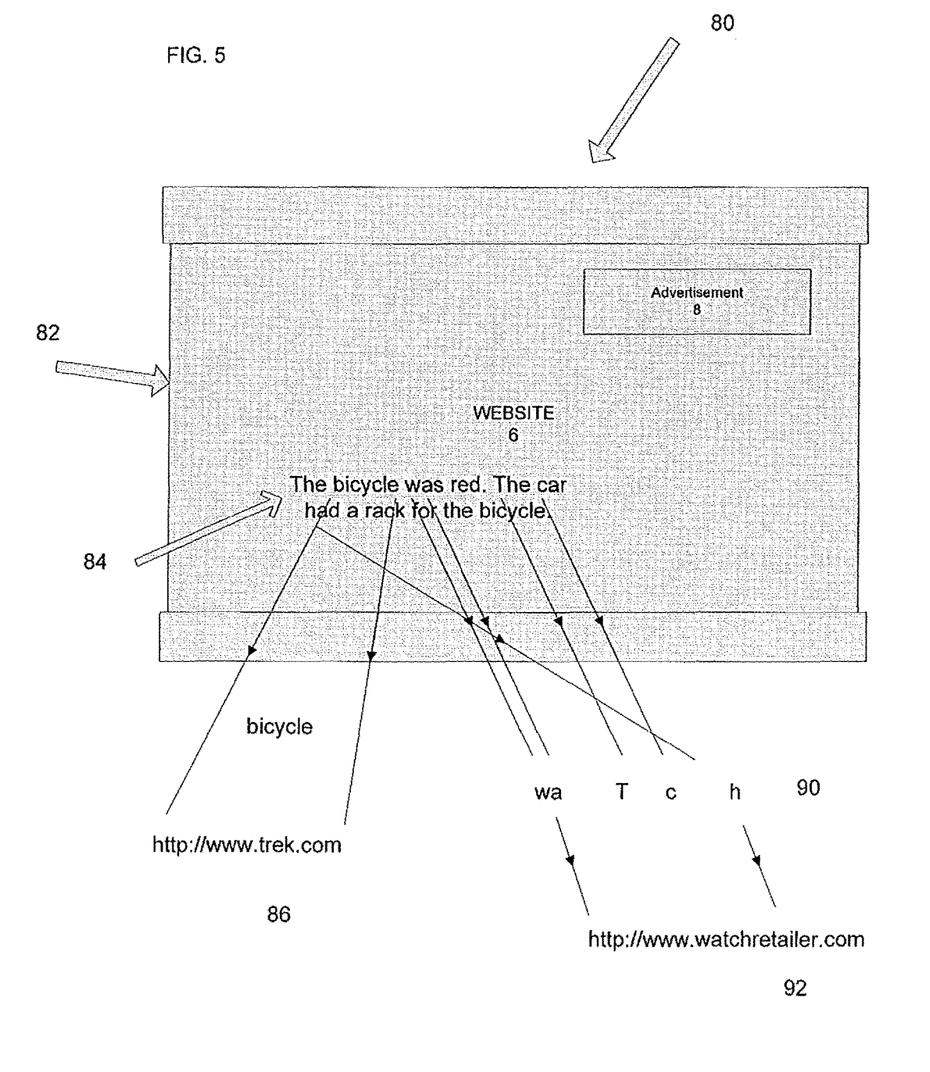
FIG. 5 is another embodiment of the present invention.

In an embodiment of the present invention, the system turns words on a web page into links as shown by FIG. 5. The links which are created by the system of the present invention are user specific, as the newly created links are based on the user's prior searches. The information contained in the prior searches includes the user's IP history, information, and data. The links which are created link to a specific advertiser and may be based on a keyword that the user types into a search engine or social media. This may all be accomplished by use of a predetermined formula or specific algorithm.

Referring to FIG. 5, there is shown an illustration of the creating links embodiment of the present invention 80. When the user 2 of FIG. 1a accesses a website 6 with their computer 4 or handheld device 5 in this embodiment, the user 2 views their screen 82 various text and content 84. Based on the prior search history of the user 2, the words and content 84 on the page of the website 6 are turned into links. For example, in FIG. 5 there is shown text stating: "The bicycle was red. The car had a rack for the bicycle." 84. As the user 2 has a recent search history of riding cycling sports and riding bicycles, the word "bicycle" in the web page text 84 creates a link 86 to a cycling website, such as the example indicated as http://www.trek/com. The links 86 which are created from words and content 84 are specific for a particular user 2 based on their particular online search history.

The analysis parameters of this embodiment of the present invention are what the user sees and what the user types for searches. This provides a profile of what content a particular user (or discrete IP address associated with a user) is interested in when surfing the online marketplace, and creating a discrete online profile/history.

Further, with this embodiment, the system allows for individual letters in the text of a web page to create a link to a word. For example, the system of the present invention may identify that the user 2 searched recently for "watch." The present invention is then able to locate the individual letters "w", "a", "t", "c", and "h", within the text 84 of a current web page to create a new link by highlighting each letter or connecting the individual letters into a link. For example, in FIG. 5 in the text "The bicycle was red. The car had a rack for the bicycle." 84, includes the letters "wa" in the word "was", the letter "T" in the word "The", the letter "c" in the word "car", and the letter "h" in the word "had." (collectively referenced by 90). Together, these individual letters form a new link to a website such as http://www-.watchretailer.com 92 which is relevant to the particular word link created by the user's search history associated with a discrete IP address for their device 5 or computer 4. The particular website link selected with the created word link may be associated with a trusted ad server/network or verified advertisements to assure that the link is free of viruses, malware, spyware, malformed or corrupt files.

This embodiment of the present invention can be accomplished with a plug in on the user's browser or at the proxy level. This embodiment is included with the present invention as a particular implementation for FIGS. 3 and 4.

In another embodiment of the present invention, the system replaces the search results provided to a user by a search engine with safe and verified advertisements from a trusted ad server. The system of the present invention may also replace the search results generated by an affiliate site with trusted and verified advertisements from a trusted server. This may be accomplished at the proxy level. This embodiment is illustrated in FIG. 6a and FIG. 6b and may be part of the system and method indicated by FIGS. 3 and 4.

Figure 6A:
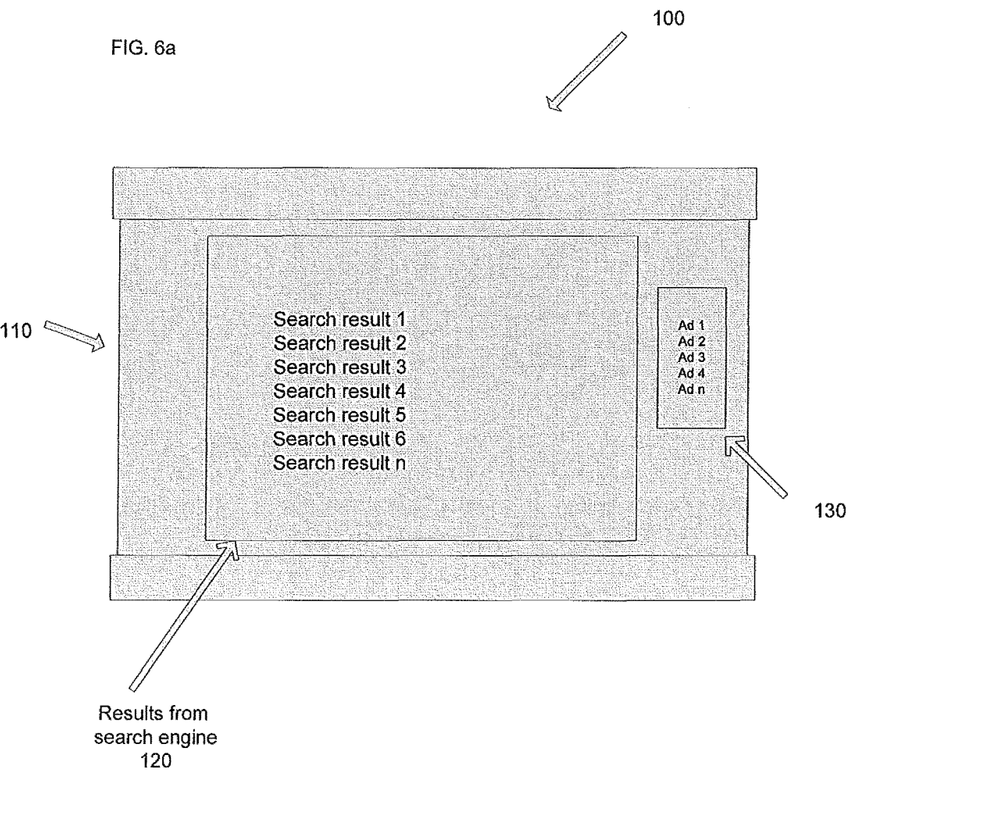
FIGS. 6a and 6b illustrate another embodiment of the present invention.
Figure 6B:
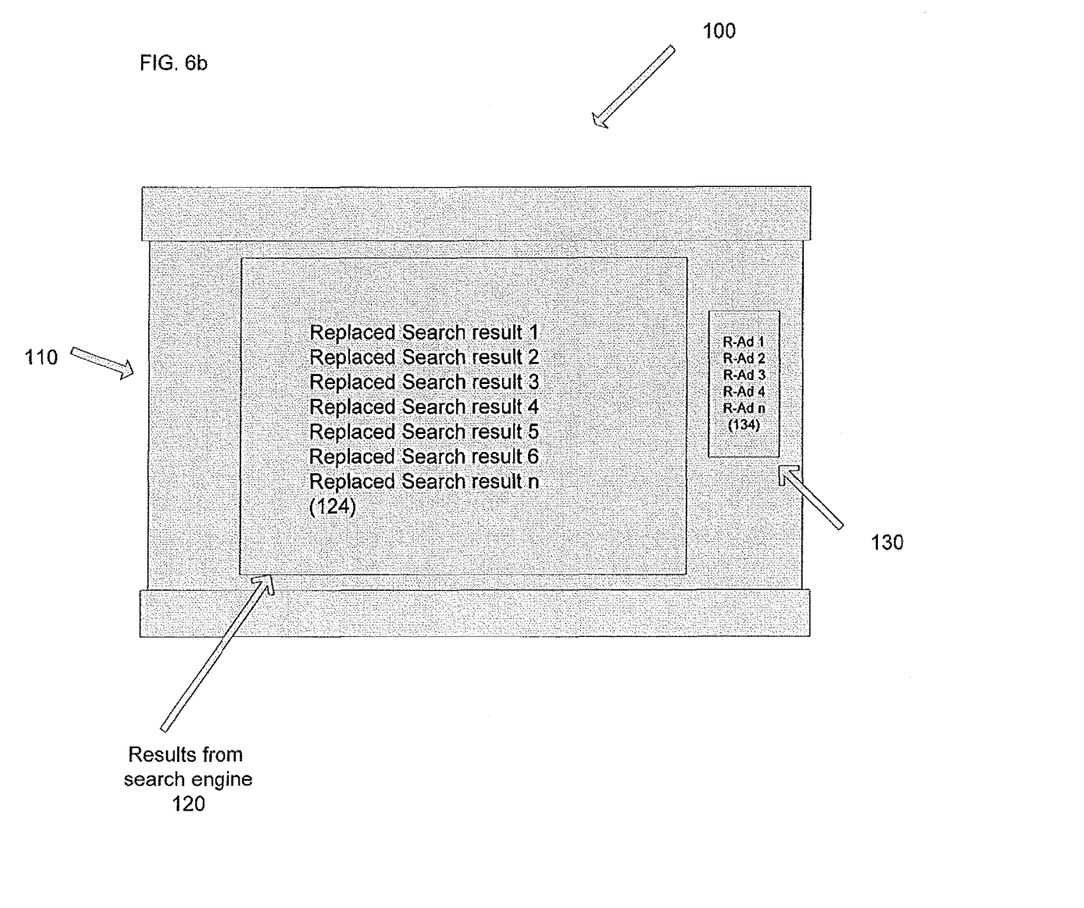

In FIG. 6a, and also referring to FIG. 1a, there is shown a user's computer or handheld device screen 100 which includes a window 110 displaying results 120 from a search engine corresponding with the user's most recent search. (More particularly identified in FIG. 6a "Search result 1" through "Search result n"). Also shown on the computer or device screen 100 is a list of affiliate ads 130, more particularly identified as "Ad 1" through "Ad n". In accordance with the present invention and as shown in FIG. 6b, these results 120 and ads 130 are replaced with verified and trusted search results 124 and trusted advertisements 134.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A computer implemented system and method for building a profile of a user associated with a particular IP address comprising:
   a. establishing in a predetermined proxy server a plurality of discrete client IP addresses,
   b. providing a direct connection from each of said discrete client IP addresses to a wide area network through said proxy server,
   c. predetermining a trusted ad server/network or database of verified advertisements and content that are free of viruses, malware or corrupt files and wherein said trusted ad server/network or database of verified advertisements and content is associated with a plurality of website links,
   d. logging on said proxy server a list of resources provided to each of said discrete client IP addresses,
   e. determining a profile on said proxy server of said list of resources provided for each of said discrete client IP addresses based on a predetermined formula,
   f. associating said profile with one of said plurality of discrete client IP addresses,
   g. calling advertisements and content from said predetermined trusted ad server/network or verified advertisements to said proxy server matching each of said plurality of website links corresponding to said profile
   h. wherein said computer implemented system allows for individual letters in a text of a web page to create a link to a word; and
   i. serving advertisements directly from said proxy server corresponding to said profile to assure that said website links are free of viruses, malware, spyWare, malformed or corrupt files to each of said discrete client IP addresses corresponding to said profile.

2. A computer implemented system and method for preventing the distribution of malware, viruses spyware or corrupt files disguised as advertising or other legitimate content comprising:
   building a profile of a user on a proxy server associated with a particular IP address comprising:
   a. establishing a proxy server with a connection to a plurality of discrete client IP addresses,
   b. providing a connection from said discrete client IP addresses to a wide area network directly through said proxy server,
   predetermining a trusted ad server/network or database of verified advertisements and content that are free of viruses, malware or corrupt files, and associated with a plurality of website links,
   c. logging on said proxy server a plurality of discrete lists of resources provided to each of said discrete client IP addresses,
   installing on said proxy server a computer application for analyzing a user's network traffic,
   d. determining a profile on said proxy server of said plurality of discrete lists of resources provided for each of said discrete client IP addresses by said computer application; and
   e. calling advertisements from said predetermined trusted ad server/network or verified advertisements and content to said proxy server in response to a call for resources from said particular IP address in response to one of said plurality of website links being selected by said user to assure that said one of said plurality of website links is free of viruses, malware, Spyware, malformed or corrupt Files
   transferring verified advertisements and content directly from said proxy server to each of said discrete client IP addresses corresponding to said profile, wherein said profile of said discrete list of resources corresponds to one or more of said plurality of discrete lists of resources; and
      wherein said computer implemented system allows for individual letters in a text of a web page to create a link to a word.

3. A computer implemented system and method for preventing the distribution of malware, viruses' spyware or corrupt files disguised as advertising or other legitimate content comprising: building a user profile associated with a particular IP address comprising;
   a. establishing a proxy server for connecting directly to a plurality of discrete client IP addresses,
   b. providing a connection from said discrete client IP addresses to a wide area network through said proxy server,
   c. predetermining a trusted ad server/network or a database of verified advertisements that are free of viruses, malware or corrupt files, d. logging on said proxy server a plurality of discrete lists of resources provided to each of said discrete client IP addresses, e. installing on said proxy server a computer application for correlating said discrete list of resources provided for each of said discrete client IP addresses, f. determining by said computer application a resource profile on said proxy server of said discrete list of resources provided for each of said discrete client IP addresses based on a predetermined formula; and g. calling to said proxy server advertisements from said predetermined trusted ad server/network or verified advertisements in response to a call for content from said particular IP address in response to a website link being selected by said user to assure that any of said content associated with said website link is free of viruses, malware, Spyware, malformed or corrupt File, and transferring directly from said proxy server at least one of said verified advertisements to each of said discrete client IP addresses and wherein said user profile is correlated on said proxy server with said resource profile; and wherein said computer implemented system allows for individual letters in the text of a web page to create a link to a word.

4. A computer implemented system and method for preventing the distribution of malware, viruses' spyware or corrupt files disguised as advertising or other legitimate content as set forth in claim 3, wherein said resource profile corresponds to one of said discrete lists of resources, wherein said computer implemented system allows for individual letters in the text of the web page to create the link to the word.

5. A computer implemented system and method for building a profile of a user associated with a particular IP address comprising:

a. establishing a proxy server for serving content to a plurality of predetermined discrete client IP addresses, b. providing a connection from said discrete client IP addresses to a wide area network through said proxy server, predetermining a trusted ad server/network or database of verified advertisements and content that are free of viruses, malware or corrupt files and wherein said trusted ad server/network or database of verified advertisements and content is associated with a plurality of website links, c. logging on said proxy server a list of resources provided to each of said discrete client IP addresses, d. said proxy server configured to determine a profile of said list of resources provided for each of said discrete client IP addresses based on a predetermined formula; and associating said profile with one of said plurality of discrete client IP addresses, calling advertisements and content from said predetermined trusted ad server/network or verified advertisements to said proxy server matching each of said plurality of website links corresponding to said profile; and e. serving advertisements from said proxy server corresponding to said profile to assure that said website link is free of viruses, malware, spyWare, malformed or corrupt files, to each of said discrete client IP addresses corresponding to said profile; and wherein said computer implemented system allows for individual letters in a text of a web page to create a link to a word.

6. A system and method to distribute advertisements to users of a computer network comprising:

a. providing said user with a network accessible device, b. associating said network accessible device, with a particular IP address, c. associating said particular IP address with a proxy server, d. installing a client side application on said network accessible device for monitoring and recording a list of network resources provided to said network accessible device, e. establishing an application on said proxy server for serving relevant content to said network accessible device and to a plurality of predetermined discrete client IP addresses, f. providing a connection from said client side application to a wide area network through said proxy server, g. limiting a connection of said network accessible device to said wide area network content through said proxy server, h. predetermining a trusted ad server/network or database of verified advertisements and content that are free of viruses, malware or corrupt files and wherein said trusted ad server/network or database of verified advertisements and content is associated with a plurality of website links, i. logging on said proxy server and on said client side application a list of resources provided to said particular IP address, j. configuring said proxy server and said client side application to determine a profile of said list of resources provided to said IP addresses based on a predetermined formula, k. associating said profile with one of said plurality of discrete client IP addresses, calling a collection of advertisements and content network traffic from said predetermined trusted ad server/network or verified advertisements to said proxy server matching each of said plurality of website links corresponding to said profile; and l. wherein aid computer implemented system allows for individual letters in the text of a web page to create a link to a word, m. serving advertisements from said proxy server corresponding to said profile to assure that said website link is free of viruses, malware, spyWare, malformed or corrupt files, to each of said particular IP address corresponding to said profile, n. monitoring said collection of advertisements and content network traffic, and o. compensating said user based on said collection of advertisements and content network traffic; and wherein said computer implemented system allows for individual letters in the text of a web page to create a link to a word.

* * * * *